US011872819B2

(12) United States Patent
Biberman et al.

(10) Patent No.: US 11,872,819 B2
(45) Date of Patent: Jan. 16, 2024

(54) DISPERSING CONCENTRATED PRINTING FLUIDS

(71) Applicant: HEWLETT-PACKARD DEVELOPMENT COMPANY, L.P., Spring, TX (US)

(72) Inventors: Roman Biberman, Shaar Efraim (IL); Jonathan Nir, Ness Ziona (IL); Alexander Yekymov, Ness Ziona (IL); Yosef Shachak, Kfar Saba (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/605,934

(22) PCT Filed: Apr. 28, 2018

(86) PCT No.: PCT/US2018/030054
§ 371 (c)(1),
(2) Date: Oct. 17, 2019

(87) PCT Pub. No.: WO2019/209350
PCT Pub. Date: Oct. 31, 2019

(65) Prior Publication Data

US 2021/0362504 A1 Nov. 25, 2021

(51) Int. Cl.

*B41J 2/165* (2006.01)
*B41J 2/17* (2006.01)
*B41J 2/175* (2006.01)

(52) U.S. Cl.
CPC ....... *B41J 2/16579* (2013.01); *B41J 2/16526* (2013.01); *B41J 2/1707* (2013.01); *B41J 2/17596* (2013.01)

(58) Field of Classification Search
None
See application file for complete search history.

(56) References Cited

U.S. PATENT DOCUMENTS 2,904,267 A * 9/1959 Lyons ..................... B28C 1/003 264/DIG. 39
5,296,137 A * 3/1994 Gershon ................. C02F 1/003 210/287
5,942,095 A * 8/1999 Day ..................... G03G 15/104 399/225
6,293,645 B1 9/2001 Kim
6,508,528 B2 1/2003 Fujii et al.
8,474,930 B2 7/2013 Rasmussen
2004/0048183 A1* 3/2004 Teshima ............... G03G 9/0819 430/137.1

(Continued)

FOREIGN PATENT DOCUMENTS

EP 0732210 A2 9/1996
JP H01176475 A 7/1989
WO WO2017025830 A1 2/2017

*Primary Examiner* — Alejandro Valencia

(57) ABSTRACT

It is disclosed a printing fluid dispersing method for a printing system, the method comprising: transferring printing fluid from a supply to an element within the printing system by a pump wherein, between the supply and the element, a nozzle is provided comprising a plurality holes so that the transferring of printing fluid comprises forcing the printing fluid through the plurality of holes of the nozzle

11 Claims, 8 Drawing Sheets

(56) References Cited

U.S. PATENT DOCUMENTS

| | | | | |
|---|---|---|---|---|
| 2007/0181156 | A1* | 8/2007 | Uz | A47L 15/0049 134/18 |
| 2009/0239170 | A1 | 9/2009 | Honda et al. | |
| 2010/0245498 | A1 | 9/2010 | Koizumi et al. | |
| 2011/0168615 | A1* | 7/2011 | Boyd | C02F 1/004 210/137 |
| 2013/0010035 | A1* | 1/2013 | Norikane | B41J 2/14233 239/4 |
| 2014/0133889 | A1* | 5/2014 | Matsumoto | G03G 15/0879 399/258 |
| 2016/0167364 | A1 | 6/2016 | Matsumoto et al. | |
| 2019/0136367 | A1* | 5/2019 | Peter | C23C 14/30 |

* cited by examiner

DISPERSING CONCENTRATED PRINTING FLUIDS

BACKGROUND

Inkjet printers are, in general terms, controllable fluid ejection devices that propel droplets of printing fluid from a nozzle to form an image on a substrate wherein such propelling can be achieved by different technologies such as, e.g., thermal injection or piezo injection.

On the other hand, electrostatic printers create an image on a photoconductive surface, apply a printing fluid having charged particles to the photoconductive surface, such that they selectively bind to the image, and then transferring the charged particles in the form of the image to a print substrate.

BRIEF DESCRIPTION OF THE DRAWINGS

Examples will now be described, by way of non-limiting example only, with reference to the accompanying drawings, in which.

DETAILED DESCRIPTION

Figure 1:
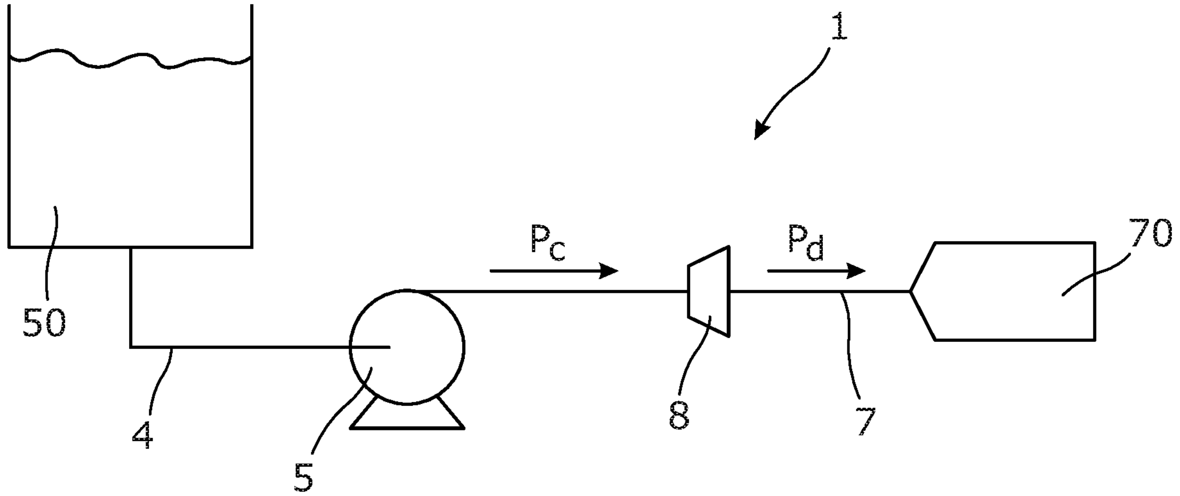
FIG. 1 shows a schematic diagram of a fluid dispersing system according to an example.

The productivity of printing systems, e.g., inkjet printers or electrostatic printers is measured by the cost-per-page (CPP) of such systems.

Having printing fluids that are more concentrated reduces the CPP of the printing systems but, also, having higher concentrations on the printing fluids implies having systems that allow for more shear to be able to disperse such printing fluids.

In both inkjet and electrostatic printing fluids, the concentration of the printing fluids may be increased to have a higher productivity and, therefore, the printing fluid may comprise a high-content on solids, in particular, non-volatile solids (NVS) that are to be dispersed in order to be able to use them in a printing system and/or prevent clogging of parts within the printing system. In an example, the solids concentration of the printing fluid may be over 20% and, in a further example, the solids concentration may be over 30%.

In an example, the dispersing of the printing fluid may be performed by batches and subsequently feeding the batches to the printer, which implies that a an off-line dispersing apparatus performs such operation and wherein batches are prepared and then fed to the printing system to perform a printer operation which is a laborsome method that takes more time and is to be performed by an operator. On the other hand, the dispersing may also be performed on-line wherein the printing system comprises a concentrated printing fluid inlet and dispersing mechanism that continuously disperses the printing fluid as feeds the dispersed printing fluid to the printer.

In a further example, the dispersing may also comprise mixing the printing fluid with a solvent.

In essence, a printing fluid dispersing method for a printing system is described, wherein the method comprises transferring printing fluid from a supply to an element within the printing system by a pump, wherein, between the supply and the element, a nozzle is provided comprising a plurality holes so that the transferring of printing fluid comprises forcing the printing fluid through the plurality of holes of the nozzle.

In an example, the element is an intermediate tank of the printing system. In a further example, the element is a printhead.

Also, the method may comprise determining a clogging state of the nozzle, wherein determining the clogging state of the nozzle comprises measuring a pressure between the pump and the nozzle so that if the pressure exceeds a predetermined threshold, the clogging state is determined. In an example, the pump may be a positive displacement pump and the pressure between the pump and the nozzle may be measured indirectly by determining a stroke period of the pump which is proportional to the pressure between the pump and the nozzle.

The method may, upon receipt of an unclogging trigger signal, performing an unclogging operation, wherein the unclogging operation comprises injecting a burst of air between the pump and the nozzle, i.e., upstream the nozzle. In an example, the unclogging trigger signal may be, e.g., a periodic signal or a signal issued by a user. In a further example, the unclogging trigger signal is issued by a controller upon determining a clogging state.

The method of claim 1 wherein the holes have a diameter between 300 microns and 700 microns.

Further, it is disclosed a printing system to be fluidly connected to a printing fluid supply, the printing apparatus comprising a fluid interconnect mechanism to be fluidly connected, on a first side to a pump associated to the printing fluid supply and, on a second side, to an element within the printing system wherein the fluid interconnect mechanism comprises a nozzle intermediate to the pump and the element, the nozzle comprising a plurality of holes with a diameter between 300 microns and 700 microns.

In an example, a clogging detector may be used wherein the detector is to determine if the nozzle is clogged in view of the pressure of fluid within the fluid interconnect mechanism. The nozzle clogging detector may be to determine if the nozzle is clogged in view of a stroke period of the pump.

Also, the fluid interconnect mechanism may comprise an unclogging port coupled to the fluid interconnect mechanism and wherein the unclogging mechanism comprises an air supply to inject an air burst through the unclogging port. For example, the unclogging mechanism may inject the air burst upon receipt of an unclogging trigger signal from a controller.

Also, it is disclosed a fluid interconnect apparatus for a printing system wherein the fluid interconnect apparatus comprises:

- a printing fluid supply coupling to be connected to a pump associated to a printing fluid supply;
- an outlet coupling to be connected to an element of a printing system; and
- a nozzle between the printing fluid supply coupling and the outlet;

the nozzle comprising a plurality of holes with a diameter between 300 microns and 700 microns so that printing fluid from the printing fluid supply is to pass through the holes of the nozzle as to reach the outlet coupling.

FIG. 1 shows a schematic example wherein a printing fluid source 50, e.g., an ink tank is provided with concentrated printing fluid (Pc) that needs to be dispersed. The printing fluid source 50 is connected by means of a printing fluid inlet 4 to the printing fluid dispersing system 1.

The printing fluid (Pc) is pumped by means of a pump 5 thereby forcing the concentrated printing fluid (Pc) through a nozzle 8 thereby obtaining dispersed printing fluid (Pd) that can be transferred, e.g., to an element 70 of the printing system that may be, for example, a printhead or an intermediate storage.

Figure 2A:
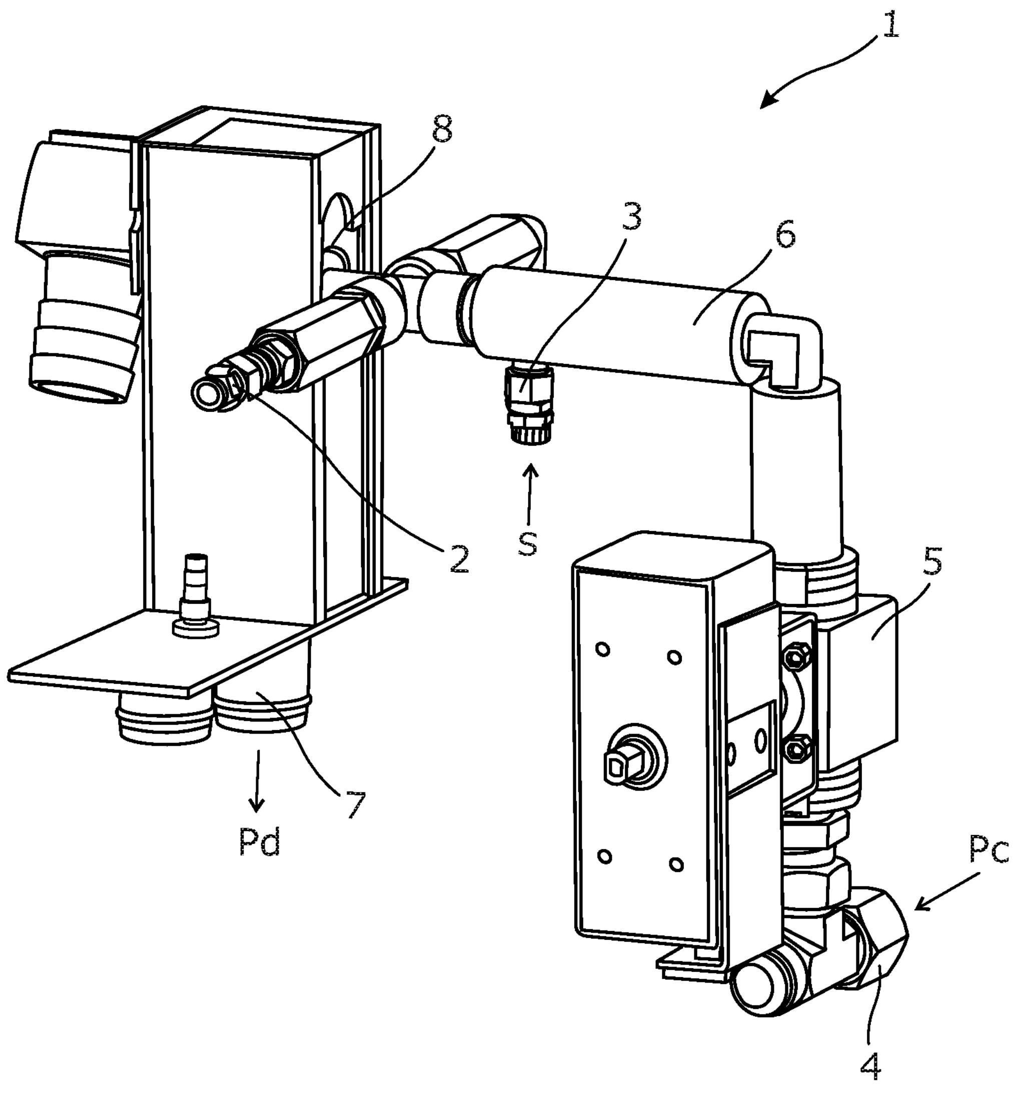
FIGS. 2A and 2B show a printing fluid dispersing system applied a printing fluid, e.g., an ink from an ink pale being transferred to an ink supply tank of a printing system.
Figure 2B:
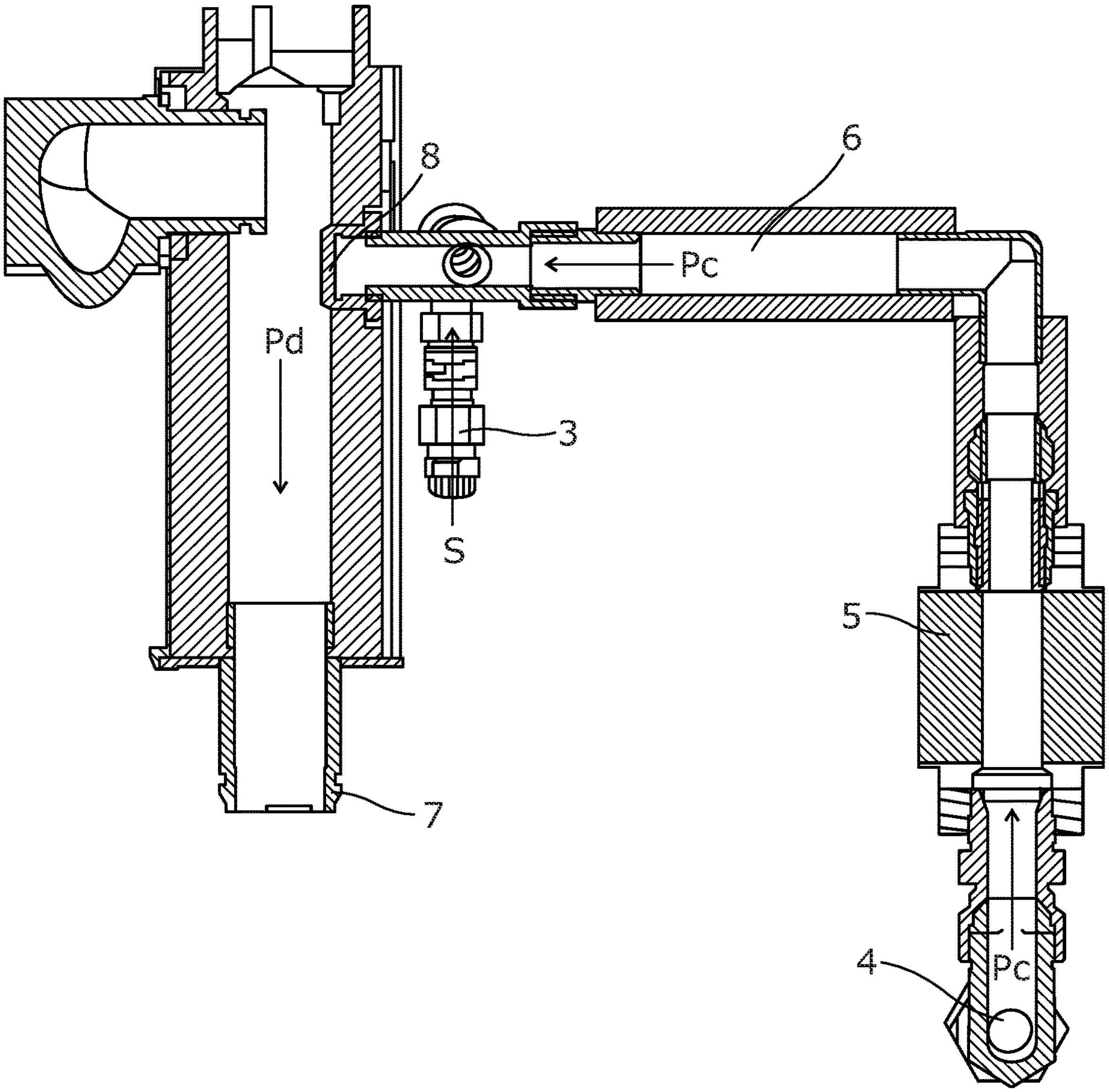

FIGS. 2A and 2B show a printing fluid dispersing mechanism 1 to be used in an electrostatic printer. In particular, the mechanism of FIGS. 1A and 1B comprises a printing fluid inlet 4 adapted to receive a concentrated printing fluid (Pc), e.g., an electrostatic ink from a printing fluid source and a printing fluid outlet 7 through which a dispersed printing fluid (Pd) is output.

The mechanism 1 may be an on-line mechanism wherein a printing fluid supply is connected to the printing fluid inlet 4 and an element within a printing system is connected to the printing fluid outlet 7 thereby avoiding the use of batches and other laborious operations to be performed by the user. The mechanism 1 comprise a pump 5 which may be, e.g., a positive displacement pump that pumps the printing fluid though an interconnect duct 6 towards a nozzle 8, the nozzle has holes through which the concentrated printing fluid (Pc) passes and is dispersed by the holes, so that downstream the nozzle 8, a dispersed printing fluid (Pd) is obtained.

Pumping the fluid through the nozzle 8 may generate several effects that are beneficial for the dispersing of the printing fluid. Such as increase of fluid speed or generating a shear on the printing fluid as will be explained with reference to FIGS. 3A and 3B.

Figure 3A:
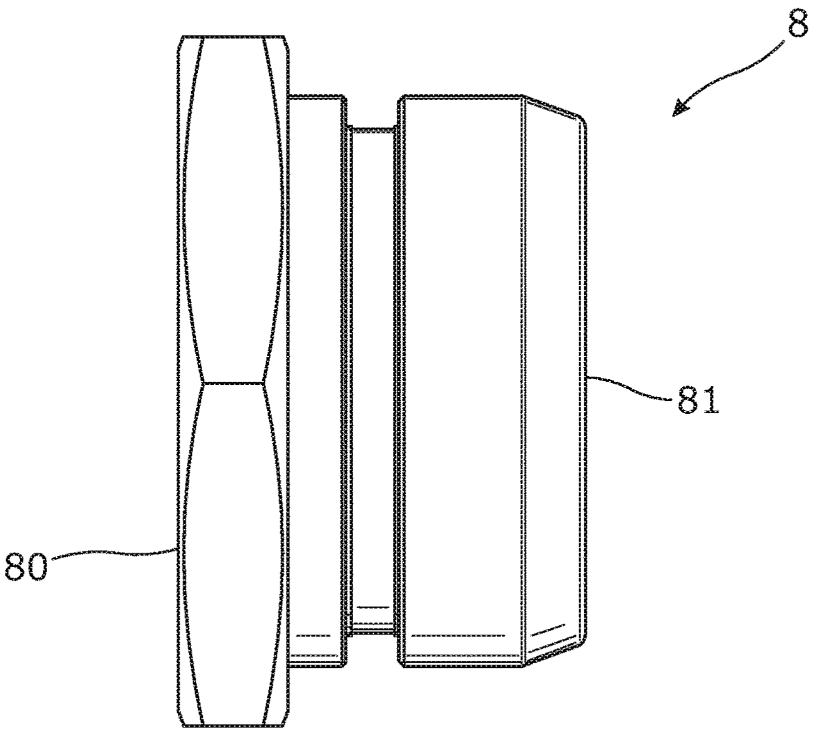
FIGS. 3A-3C show an example of a nozzle for dispersing a printing fluid.
Figure 3B:
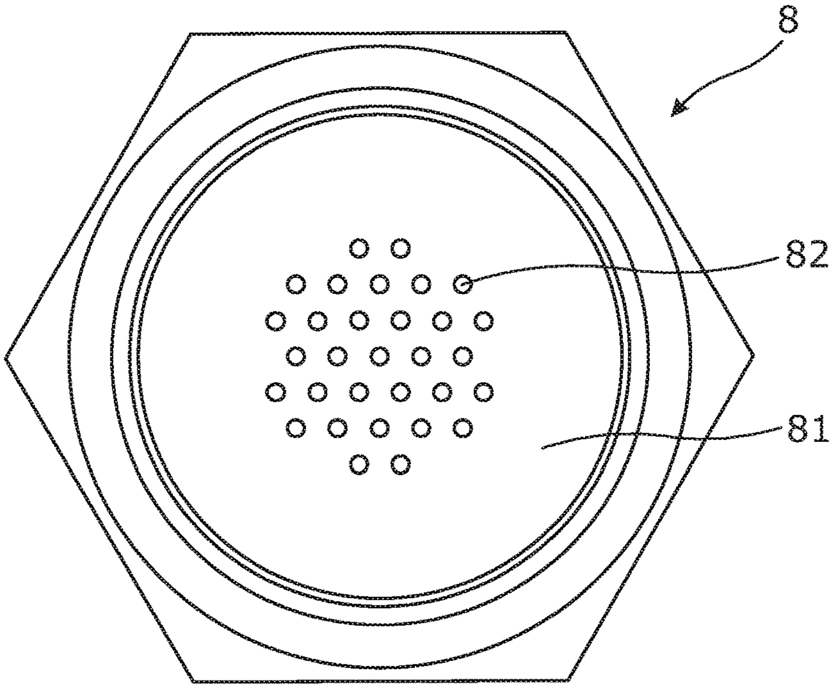

FIGS. 3A and 3B show an example of a nozzle 8 that may be used in a dispersing mechanism 1 of the type of FIGS. 2A and 2B. The nozzle 8 comprises a nozzle inlet 80, a nozzle outlet 81 and a plurality of holes 82 that generate a fluid passage between the nozzle inlet 80 and the nozzle outlet 81.

In an example, the holes 82 of the nozzle 8 are dimensioned to allow the printing fluid to pass but, given that the holes have a smaller diameter than the interconnect duct 6, the speed increases as if flows via the holes due to mass conservation, therefore, the smaller the holes 82, the greater the speed. This effect may help, e.g., for mixing the concentrated printing fluid (Pc) with a solvent (S) that may be fed through a solvent inlet 3 to the interconnect duct 6. In this case, holes 82 with a dimeter of around 700 microns may be adequate to achieve this increased speed.

Furthermore, the increased speed of the fluid inside the holes 82 result in shear forces that allow the dispersion effect to take place. Also, a turbulent flow may be generated upstream the nozzle and, by its very irregular structure, such turbulent flow is highly favorable to mixing.

In another example, the holes 82 of the nozzle 8 are dimensioned to directly break a compound, e.g., aglomerants within the concentrated printing fluid (Pc), by using a high-pressure pump and a nozzle with holes 82 of a diameter of around 300 microns or 400 microns. In this approach, the concentrated printing fluid (Pc) is pushed through a tight passage of a few hundred microns in diameter, i.e., the holes 82. The concentrated printing fluid (Pc) is subjected to extremely high planar shear and elongation shear causing the breakdown of the aglomerants so that, downstream the nozzle 8, a dispersed printing fluid (Pd) is obtained.

Also, the nozzle may comprise holes 82 of different diameters or holes 82 with the same diameter in a range between 300 microns and 700 microns.

In an example, dispersion parameters are measured for a nozzle having eight holes with a diameter of 300 microns. The dispersion parameters obtained are shown in the table below

| Dispersion parameters | 8 * 300μ diameter holes |
|---|---|
| Tail 20 | 6 |
| D(0.5) | 7.6 |

Therefore, it is considered that the dispersion obtained by forcing the fluid through holes, e.g., in the range between 300-700 microns achieves a proper dispersion while achieving a lower effect on the temperature the ink when compared, e.g., with dispersion methods including a mixer.

Given the nature of the method wherein a fluid with some solid content is forced through a nozzle with holes of a determined diameter to achieve a dispersion, the nozzle may be susceptible to clogging. Therefore, the dispersing mechanism 1 may comprise an air inlet 2 downstream the nozzle 8, as shown in FIGS. 2A, 2B, wherein the air inlet 2 is to be connected to a pressurized air source, e.g., an air pump that may be configured to issue an air burst downstream the nozzle 8 to perform an unclogging operation. Such unclogging operation and clog detection will be explained in more detail with reference to FIGS. 5 and 6.

An example of manufacturing method for a nozzle 8 with a configuration as explained above is to avoid the presence of burr because it may affect the nozzle 8 and may increase the probabilities of the nozzle 8 getting clogged by the printing fluid.

Figure 3C:
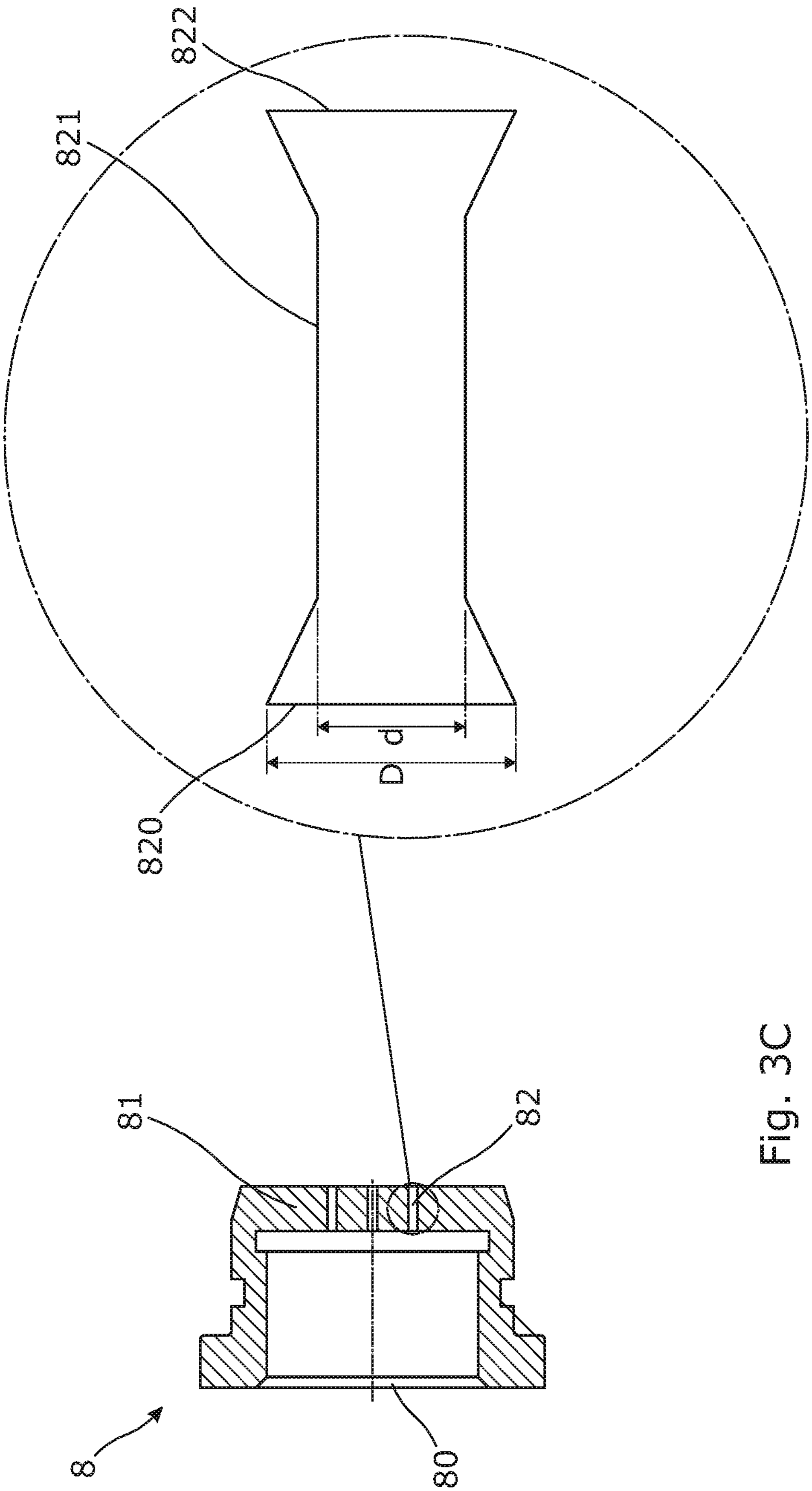

FIG. 3C shows an example of nozzle 8 wherein a nozzle is manufactured by boring a through hole defining an internal passage 821 of a first diameter (d) that substantially defines the hole diameter, e.g., a 300 microns to 700 microns passage. Further, a couple of non-through complimentary borings 820, 822 are performed with a second diameter (D) at both ends of the passage 821 to at least, partly remove, some of the burr that may be left over from boring the passage 821.

Figure 4:
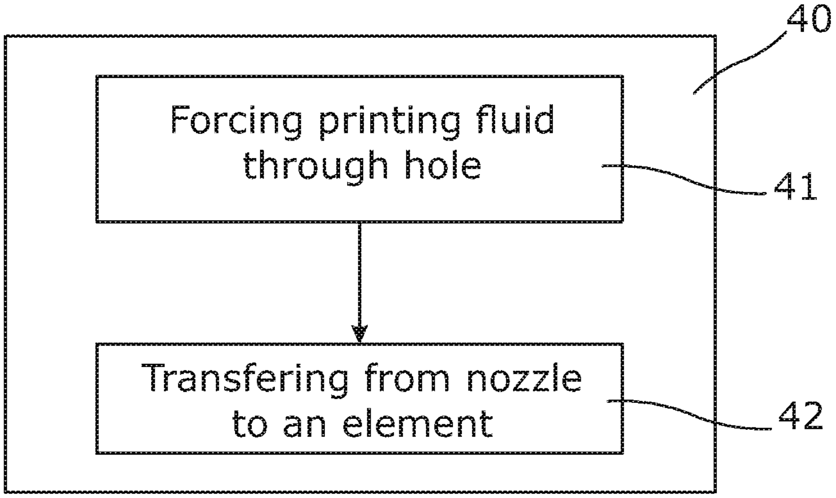
FIG. 4 shows a flow diagram with an example of a printing fluid dispersing method.

FIG. 4 shows an example of a method for performing a printing fluid dispersion that may be used on-line in a printing system. The dispersing of the printing fluid 40 may be performed by forcing printing fluid 41 through a hole, e.g., a hole within a nozzle and, subsequently, transferring the printing fluid from the nozzle to another element within the printing system 42 such as, for example, an intermediate tank in the case of electrostatic printing or to a printhead, in the case of inkjet printing.

As mentioned above, a feature that may be implemented in a dispersion method or apparatus according to the present disclosure is having the capability to implement an unclogging mechanism using the means normally present in a printing environment. In particular, such unclogging mechanism may be automatic or, at least, partially automatic.

An example of unclogging mechanism is by injecting a burst of air through an air inlet 2 upstream the nozzle 8 as shown in FIG. 2A. An issue that arises is the detection of a clogging condition of the nozzle that may be used as unclogging trigger signal for the unclogging mechanism.

In an example, a pressure detector may be coupled to the interconnect duct 6 between the pump 5 and the nozzle 8. If pressure exceeds a determined threshold, a unclogging trigger signal may be used to a controller to inject a burst of air, e.g., a 6 bar air burst that may, at least, partly unclog the nozzle 8.

In a further example, a positive pressure pump may be used as pump 5 and the stroke period of the pump may be used as an indirect measurement of the pressure upstream the nozzle, i.e., between the nozzle and the pump 5 being the stroke period defined as the time to complete a full stroke. In this example, if the stroke period of the pump 5 is above a determined threshold, an unclogging trigger signal is issued to a controller that is to control the air burst injection upstream the nozzle. This operation may be performed several times until the stroke period is below the threshold.

In an example, the air bursts are injected between stroke periods of the pump 5 so that the air burst do not interfere with the operation of the pump.

Figure 5:
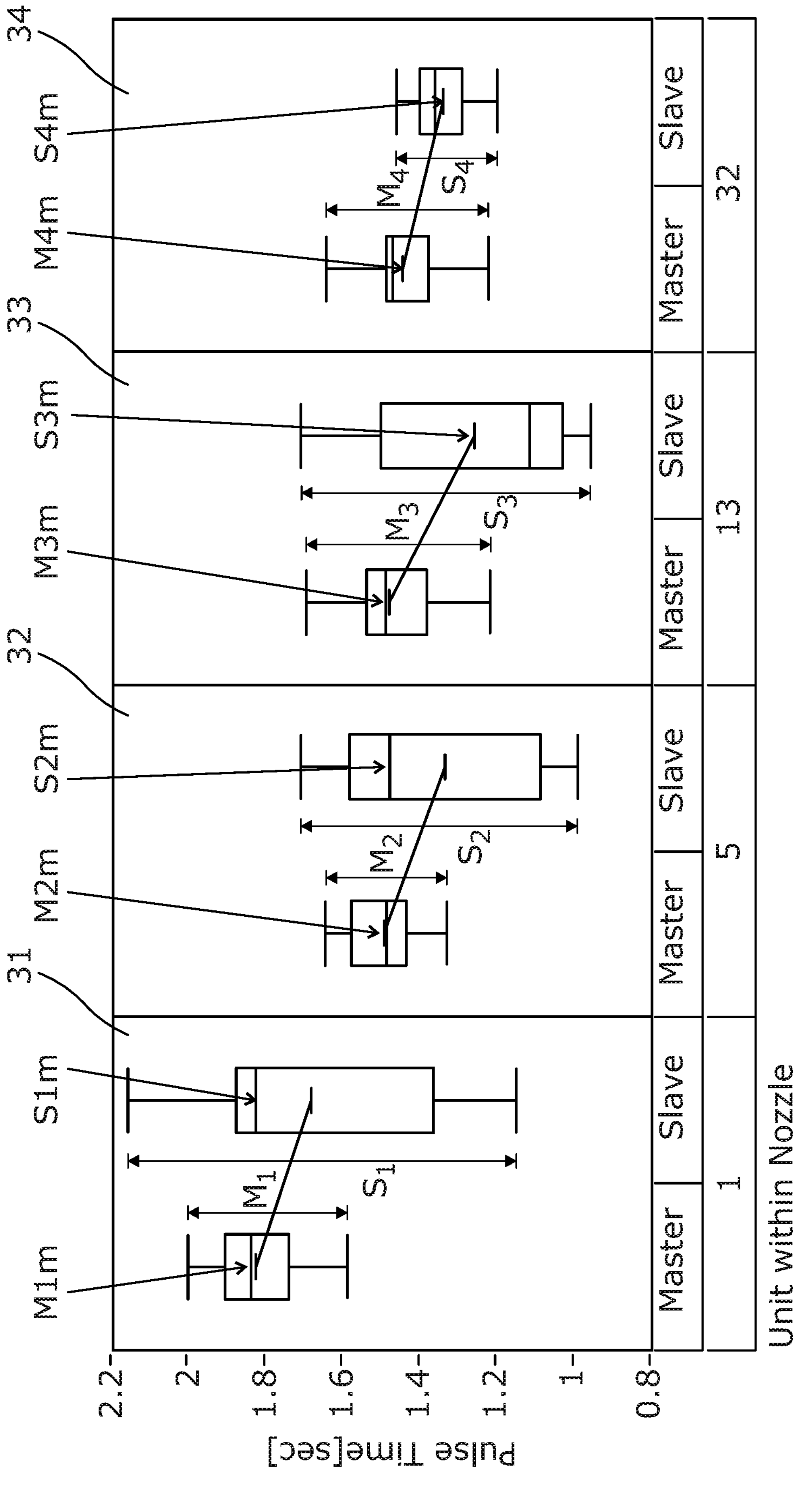
FIG. 5 shows examples of stroke periods of a positive displacement pump for a nozzle in different clogging conditions.

In FIG. 5, several scenarios are simulated wherein: in a first scenario 31, one hole within the nozzle is unclogged; in a second scenario 31, five nozzles are unclogged; in a third scenario 33, thirteen holes within the nozzle are unclogged; and in a fourth scenario 34, thirty-two holes within the nozzle are unclogged. Also, the simulations were made on a master unit comprising master pump a printing fluid dispersing mechanism and a slave unit comprising a slave pump and a fluid dispersing mechanism for each scenario.

In the first scenario 31, the stroke periods are within a first master range $M_1$ for the master unit and within a first slave rage $S_1$ for the slave unit, in this case, the mean $M_{1m}$ for the first master range $M_1$ is of around 1.85 sec and the mean $S_{1m}$ for the first slave range $S_1$ is of around 1.7 sec. In the second scenario 32, the stroke periods are within a second master range $M_2$ for the master unit and within a second slave rage $S_2$ for the slave unit, in this case, the mean $M_{2m}$ for the second master range $M_2$ is of around 1.45 sec and the mean $S_{2m}$ for the second slave range $S_2$ is of around 1.35 sec. In the third scenario 33, the stroke periods are within a third master range $M_3$ for the master unit and within a third slave rage $S_3$ for the slave unit, in this case, the mean $M_{3m}$ for the third master range $M_3$ is of around 1.45 sec and the mean $S_{1m}$ for the third slave range $S_3$ is of around 1.25 sec. In the fourth scenario 34, the stroke periods are within a fourth master range $M_4$ for the master unit and within a fourth slave rage $S_4$ for the slave unit, in this case, the mean $M_{4m}$ for the fourth master range $M_4$ is of around 1.45 sec and the mean $S_{1m}$ for the fourth slave range $S_4$ is of around 1.3 sec.

Therefore, in the example of FIG. 5, the threshold measured in reference to the mean stroke period of the pump may be set to be of around 1.6 sec. In a further example, the threshold may be set as a percentage of the stroke period in view of a stroke period wherein all nozzles are unclogged, e.g., a threshold may be set to determine if the stroke period of the pump have been increased by over 10% from the non-clogged condition. In a further example, the threshold may be set as approximately 15% stroke period increase with a tolerance of ±3%.

Figure 6:
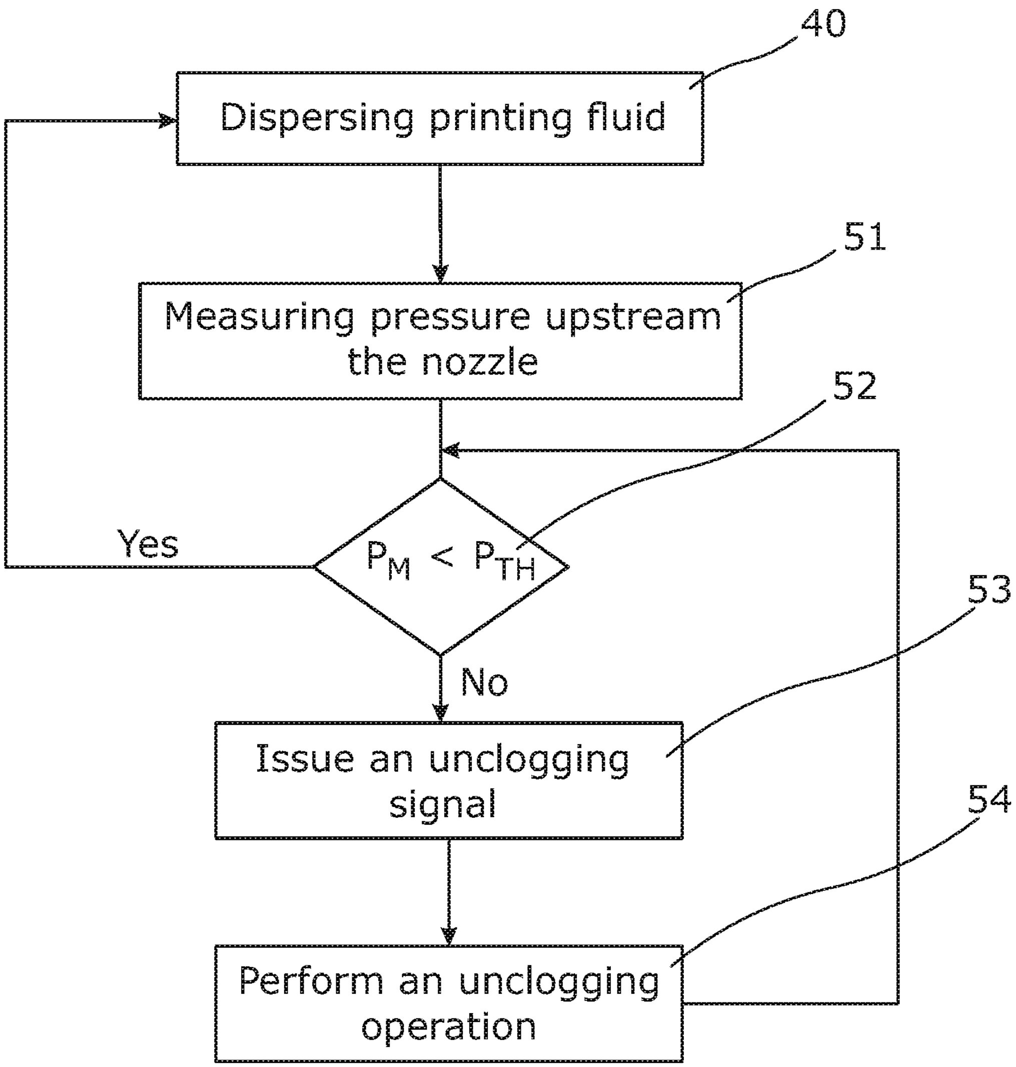
FIG. 6 shows an example of a clogging detection and unclogging operation method.

FIG. 6 shows an example of method that may be performed by a controller to execute a dispersing operation with automatic unclogging detection and unclog operation. In the example of FIG. 6, a dispersing of printing fluid is performed, e.g., by forcing the printing fluid through a hole as discussed with reference to FIG. 3. Subsequently, a measuring of the pressure 51 upstream the hole (or the nozzle comprising a hole) may be performed to establish a possible clogging condition. A determination 52 is made of whether the measured pressure ($P_M$) is below a determined threshold ($P_{TH}$). If it is, the dispersing is continued and no unclogging operation is performed.

If the measured pressure ($P_M$) is above the threshold ($P_{TH}$), this means that the nozzle may be, at least, partially clogged so an unclogging operation may be desirable. Therefore, an unclogging signal may be issued 53, e.g., by a controller associated to the pressure measurement and an unclogging operation is performed 54, e.g., a burst of air is injected upstream the nozzle.

In an example, the pressure measurement may be performed indirectly, e.g., by measuring the stroke period of a pump thereby avoiding the incorporation of further sensors, such as a pressure sensor.

Furthermore, the controller may be a combination of circuitry and executable instructions representing a control program to: receive signals such as, e.g., a signal indicative of the pressure between the nozzle and the pump; to perform operations e.g., to determine if the pressure is above a determined threshold; and to issue signals such as, e.g., the unclogging trigger signal. In general, the controller may be a nontransitory machine-readable storage medium encoded with instructions executable by a processing resource of a computing device to perform methods such as those described herein.

The invention claimed is:

1. A printing fluid dispersing method for a printing system, the method comprising:

pumping printing fluid from a supply through a nozzle within the printing system by a pump, wherein the pump is a positive pressure pump, the printing fluid having some solid content, wherein, the nozzle comprises a nozzle inlet and nozzle outlet, the nozzle outlet including a member comprising a plurality of holes, wherein pumping the printing fluid through the member causes a dispersed printing fluid to be obtained downstream the nozzle outlet;

determining a clogging state of the nozzle wherein determining the clogging state of the nozzle includes determining a stroke period of the pump is greater than a threshold amount with respect to a reference stroke period;

upon determining a partially clogged state based on the stroke period being greater than the threshold amount, performing an unclogging operation, wherein the unclogging operation comprises injecting a burst of air upstream the nozzle between stroke periods of the pump, the burst not interfering with operation of the pump; and transferring obtained dispersed printing fluid to an element of the printing system.

2. The method of claim 1, wherein the element is an intermediate tank of the printing system.

3. The method of claim 1, wherein the element is a printhead.

4. The method of claim 1, wherein the holes have a diameter between 300 microns and 700 microns.

5. A printing system to be fluidly connected to a printing fluid supply, the printing system comprising:

a fluid interconnect mechanism to be fluidly connected, on a first side, to a positive pressure pump associated to the printing fluid supply and, on a second side, to an element within the printing system;

a nozzle in the fluid interconnect mechanism, the nozzle comprising a nozzle inlet and nozzle outlet, the nozzle outlet including a member comprising a plurality of holes; and a nozzle clogging detector, wherein the detector is to determine if the nozzle is clogged in view of a stroke period of the pump being greater than a threshold amount with respect to a reference stroke period;

an unclogging mechanism, wherein the fluid interconnect mechanism comprises an unclogging port and the unclogging mechanism comprises an air supply to inject an air burst through the unclogging port into the fluid interconnect mechanism, wherein the unclogging mechanism is to inject the air burst upon receipt of an unclogging trigger signal from a controller, wherein the air burst is injected between stroke periods of the pump, the burst not interfering with operation of the pump;

wherein the holes of the nozzle are structured to reduce a concentration of solid content in printing fluid of the printing fluid supply during transfer of the printing fluid under pressure from the pump from the printing fluid supply to the element by forcing the printing fluid through the plurality of holes of the member, such that a dispersed printing fluid is obtained downstream the member.

6. The method of claim 1, wherein pumping the printing fluid through the nozzle creates turbulence in a flow of the printing fluid upstream from the nozzle.

7. The method of claim 1, wherein pumping the printing fluid through the nozzle creates shear force to break up agglomeration of the solid content within the printing fluid.

8. The system of claim 5, wherein the element is a printhead structured to print with the printing fluid at the reduced concentration of solid content.

9. The system of claim 5, wherein the holes have a diameter between 300 microns and 700 microns.

10. The method of claim 1, wherein the threshold amount in the range of 12-18 percent.

11. The device of claim 5, wherein the threshold amount in the range of 12-18 percent.

* * * * *